(12) United States Patent
Sammut (10) Patent No.: US 9,596,798 B2
(45) Date of Patent: Mar. 21, 2017

(54) SOD ROLL LAYER COMPACTOR

(71) Applicant: Trebro Holding, Inc., Billings, MT (US)

(72) Inventor: Daniel Sammut, Freemans Reach (AU)

(73) Assignee: Trebro Holding, Inc., Billings, MT (US)

( * ) Notice: Subject to any disclaimer, the term of this patent is extended or adjusted under 35 U.S.C. 154(b) by 0 days.

(21) Appl. No.: 14/396,159

(22) PCT Filed: May 17, 2013

(86) PCT No.: PCT/US2013/041596
§ 371 (c)(1),
(2) Date: Oct. 22, 2014

(87) PCT Pub. No.: WO2013/173717
PCT Pub. Date: Nov. 21, 2013

(65) Prior Publication Data
US 2015/0122515 A1 May 7, 2015

Related U.S. Application Data

(60) Provisional application No. 61/648,330, filed on May 17, 2012.

(51) Int. Cl.
*A01B 45/04* (2006.01)
(52) U.S. Cl.
CPC .................. *A01B 45/045* (2013.01)
(58) Field of Classification Search
CPC .................................. A01B 45/045
USPC ............................................. 172/19
See application file for complete search history.

(56) References Cited

U.S. PATENT DOCUMENTS

| | | | | | |
|---|---|---|---|---|---|
| 4,966,239 | A | * | 10/1990 | Hutchison | A01B 45/045 172/20 |
| 5,230,602 | A | * | 7/1993 | Schouten | A01B 45/045 414/789.7 |
| 5,269,379 | A | * | 12/1993 | Millar | A01B 45/045 172/19 |
| 6,681,864 | B2 | * | 1/2004 | Tvetene | A01B 45/045 172/20 |
| 6,783,318 | B2 | * | 8/2004 | Tvetene | A01B 45/045 172/20 |
| 7,066,277 | B2 | * | 6/2006 | Hendriks | A01B 45/045 172/19 |
| 7,096,967 | B2 | * | 8/2006 | Pohlman, Jr. | A01B 45/045 172/20 |

(Continued)

*Primary Examiner* — Robert Pezzuto
*Assistant Examiner* — Joel F. Mitchell
(74) *Attorney, Agent, or Firm* — Antoinette M. Tease (57) ABSTRACT

A sod harvester comprising a sod cutter assembly that shaves slabs of sod material from a field and cm them into lengths; a sod rolling assembly that rolls the sod slabs as they are conveyed to a sod roll array forming station; a pick-and-place apparatus comprising a pick head that picks up arrays of sod rolls and places them in layers onto a first location: a layer compactor that is in a retracted position while the pick head deposits the arrays of sod rolls and that pushes against a layer of sod rolls while the pick head moves to pick up an array of sod rolls; and a side compactor that pushes against the sod rolls In a direction orthogonal to that of the layer compactor.

2 Claims, 9 Drawing Sheets

(56) References Cited

U.S. PATENT DOCUMENTS

| | | | | |
|---|---|---|---|---|
| 7,467,667 B2* | 12/2008 | Pohlman, Jr. | ......... | A01B 45/045 |
| | | | | 172/20 |
| 2001/0050174 A1* | 12/2001 | Van Vuuren | ......... | A01B 45/045 |
| | | | | 172/20 |
| 2006/0102363 A1* | 5/2006 | Tvetene et al. | ...... | A01B 45/045 |
| | | | | 172/20 |

\* cited by examiner

SOD ROLL LAYER COMPACTOR

CROSS-REFERENCE TO RELATED APPLICATION

This application claims priority back to U.S. Patent Application No. 61/648,330 filed on May 17, 2012.

BACKGROUND

Field of the Invention

The present invention relates generally to the field of sod harvesters and, more specifically, to a sod roll layer compactor Description of the Related Art A typical a sod harvester cuts a slab of sod and rolls each slab into a cylindrical roll. The sod rolls are then transferred to and stacked on a pallet for delivery. Various mechanized sod handling equipment is known in the prior art. Of particular interest here are mechanized devices for creating rolls from slabs of sod. For example, U.S. Pat. Nos. 6,296,003 and 6,364,027 both disclose sod rolling mechanisms. Typically, a sod roller includes a conveyor that transfers and rolls the sod slabs. A friction ladder is supported above the conveyor and the conveyor belt acts to roll each sod slab against the ladder. Sod rolls are accumulated in an array which is then stacked in layers of alternating rows and columns. The layers of sod rolls are stacked on a pallet to facilitate transport to the location needing fresh sod. Generally, pallets of sod are loaded on a truck for transport. In traditional sod harvesting equipment the sod roll layers are not particularly compact. Thus, the stacks often extend beyond the envelope of a typical pallet, which may necessitate more room on the truck, thereby limiting how many stacks can be loaded for a single delivery. Furthermore, the rolls may have a tendency to come unrolled if not tightly packed in stack form for transport.

Accordingly, there is a need for an apparatus that stacks layers of sod rolls in a compact fashion to minimize shipping space and help ensure that sod rolls do not come unrolled.

BRIEF SUMMARY OF THE INVENTION

The present invention is a sod harvester comprising: (a) a sod cutter assembly that shaves slabs of sod material from a field and cut them into lengths; (b) a sod rolling assembly that rolls the sod slabs as they are conveyed to a sod roll array forming station; (c) a pick-and-place apparatus comprising a pick head that picks up arrays of sod rolls and places them in layers onto a first location; and (d) a layer compactor that is in a retracted position while the pick head deposits the arrays of sod rolls and that pushes against a layer of sod rolls while the pick head moves to pick up an array of sod rolls. In a preferred embodiment, the invention further comprises a side compactor that pushes against the sod rolls in a direction orthogonal to that of the layer compactor.

In a preferred embodiment, the layers of sod rolls are placed in alternating columns and rows to form a stack; wherein as each layer of sod rolls is formed, a lift mechanism lowers the stack such that each consecutive layer of sod rolls is placed at a same level; wherein the layer compactor pushes the columns against a backstop; wherein the side compactor pushes the rows against a backstop; and wherein the layer compactor and the side compactor push the columns and rows of sod rolls together to form a tightly packed sod stack.

In a preferred embodiment, the layer compactor is comprised of a pair of cylinders that are disposed beneath a pallet magazine; wherein a pusher bar is attached to the cylinders; wherein the pusher bar is extendible in a direction longitudinal with a frame of the harvester; and wherein the side compactor extends orthogonally with respect to the layer compactor and in a direction transverse to the frame. Preferably, the side compactor is comprised of a side push bar that is attached to a pair of cylinders.

BRIEF DESCRIPTION OF THE DRAWINGS

The accompanying drawings, which are incorporated in and constitute a part of this specification, illustrate embodiments of a sod roll layer compactor and together with the description, serve to explain the principles and operation thereof. Like items in the drawings are generally referred to using the same numerical reference.

DETAILED DESCRIPTION

Figure 1:
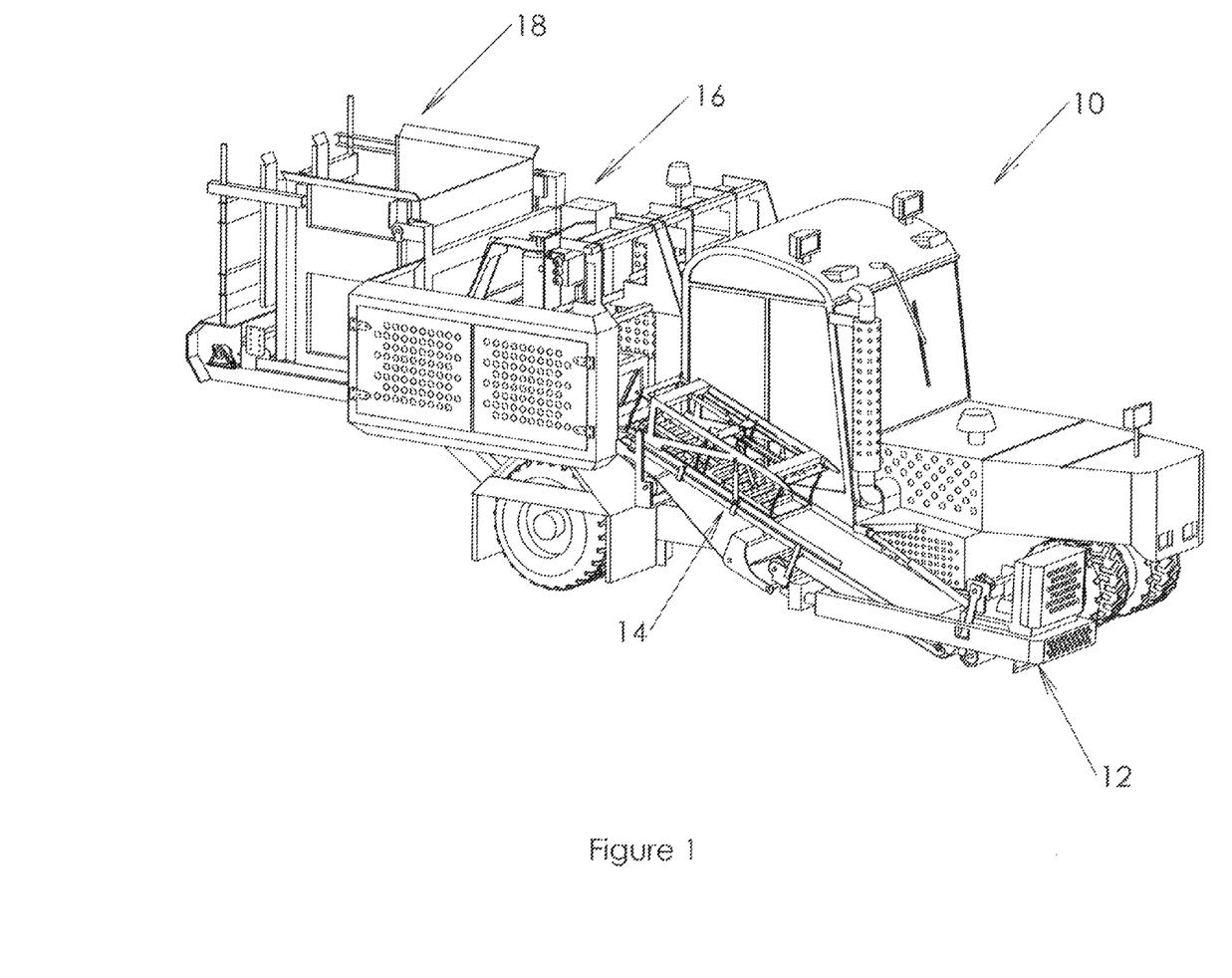
FIG. 1 is a side view of an exemplary sod harvester.
Figure 2:
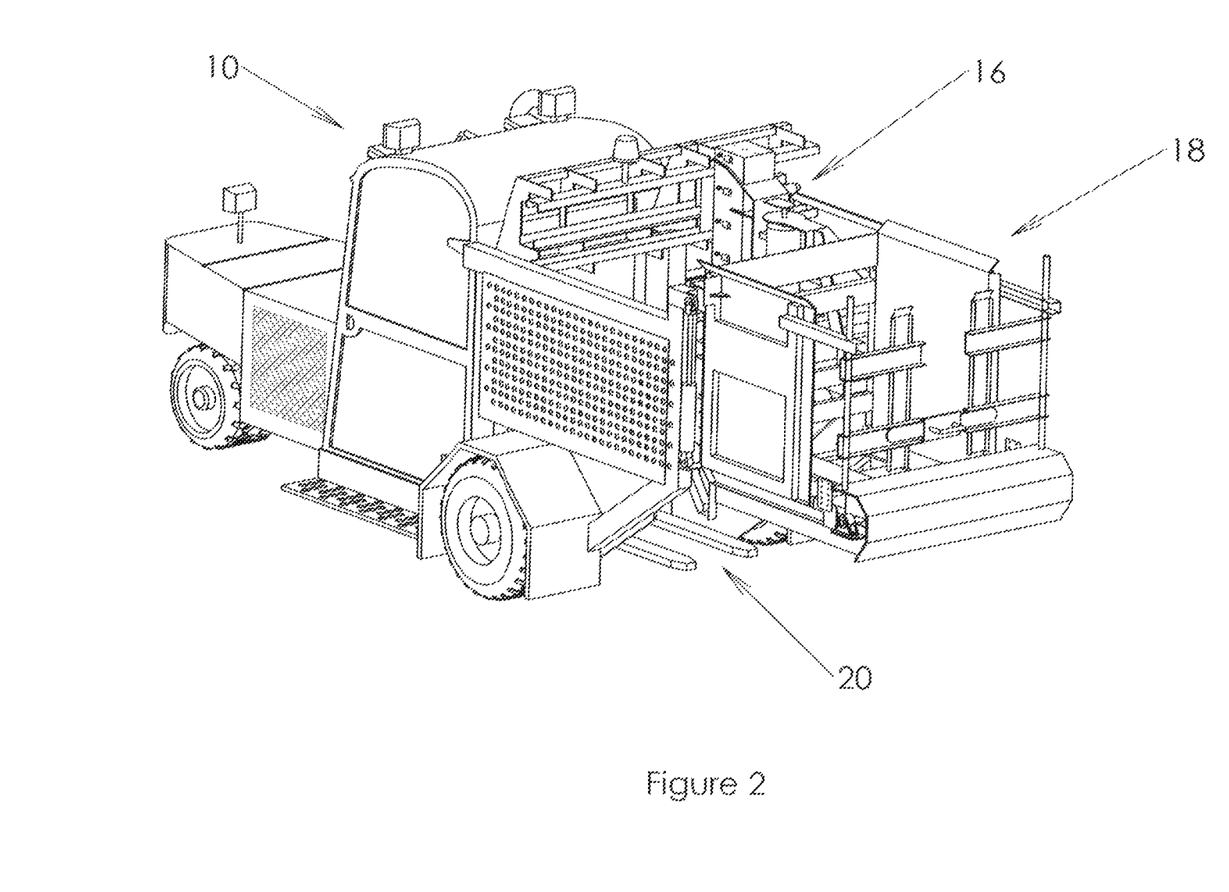
FIG. 2 is a perspective view of the sod harvester shown in FIG. 1 as viewed from the rear of the vehicle.

Described herein is a sod roll layer compactor that is operative to compact each layer of a stack of sod rolls in order to minimize shipping space and help ensure that the sod rolls do not come unrolled. The sod harvester 10 shown in FIG. 1 includes a sod cutter assembly 12 that is operative to shave slabs of sod material from a field and cut them into lengths. The sod rolling assembly 14 rolls each slab as it is conveyed to a sod roll array forming station. A pick-and-place apparatus 16 is operative to pick each sod array and place it on a pallet. With further reference to FIG. 2, pallets are fed into a sod stacking region 20 from a pallet magazine 18.

Figure 3:
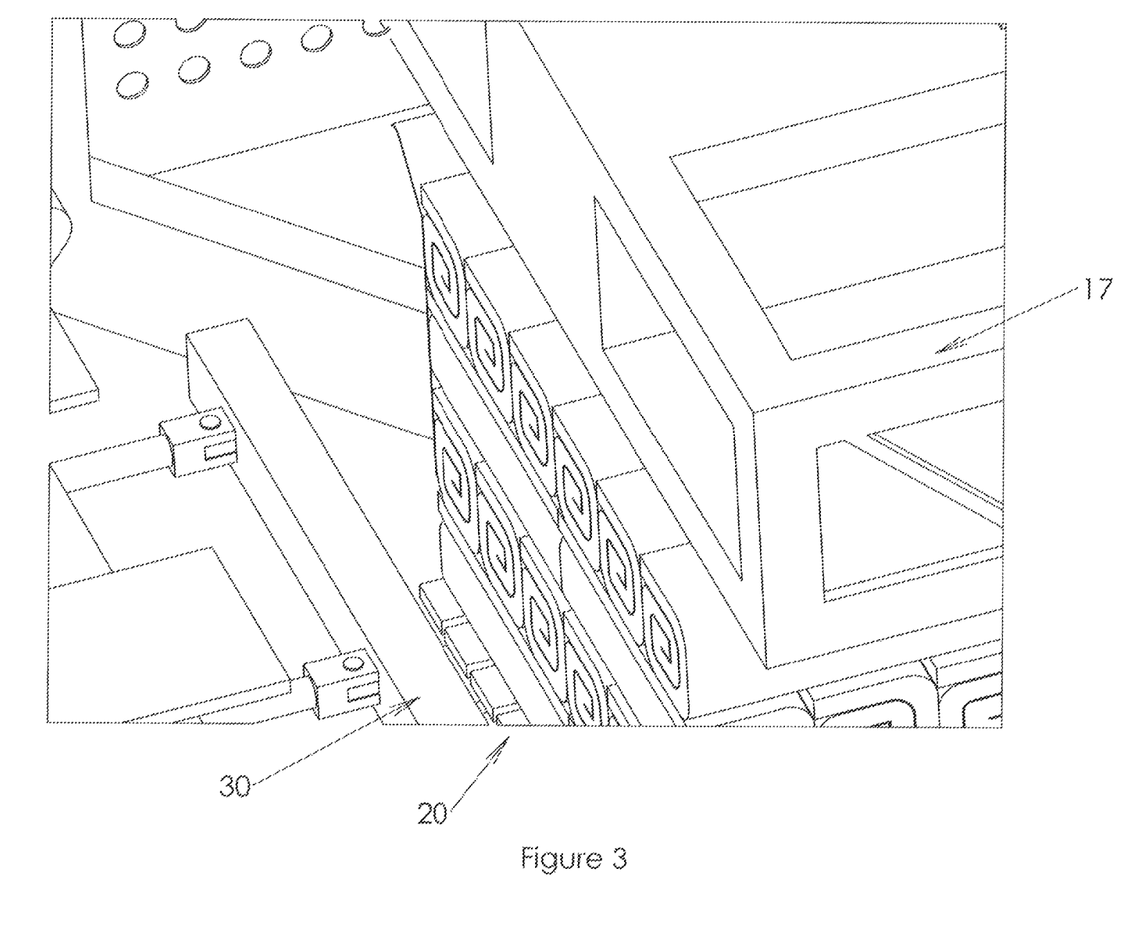
FIG. 3 is a perspective view of the pallet stacking region of the sod harvester shown in FIGS. 1 and 2.
Figure 4:
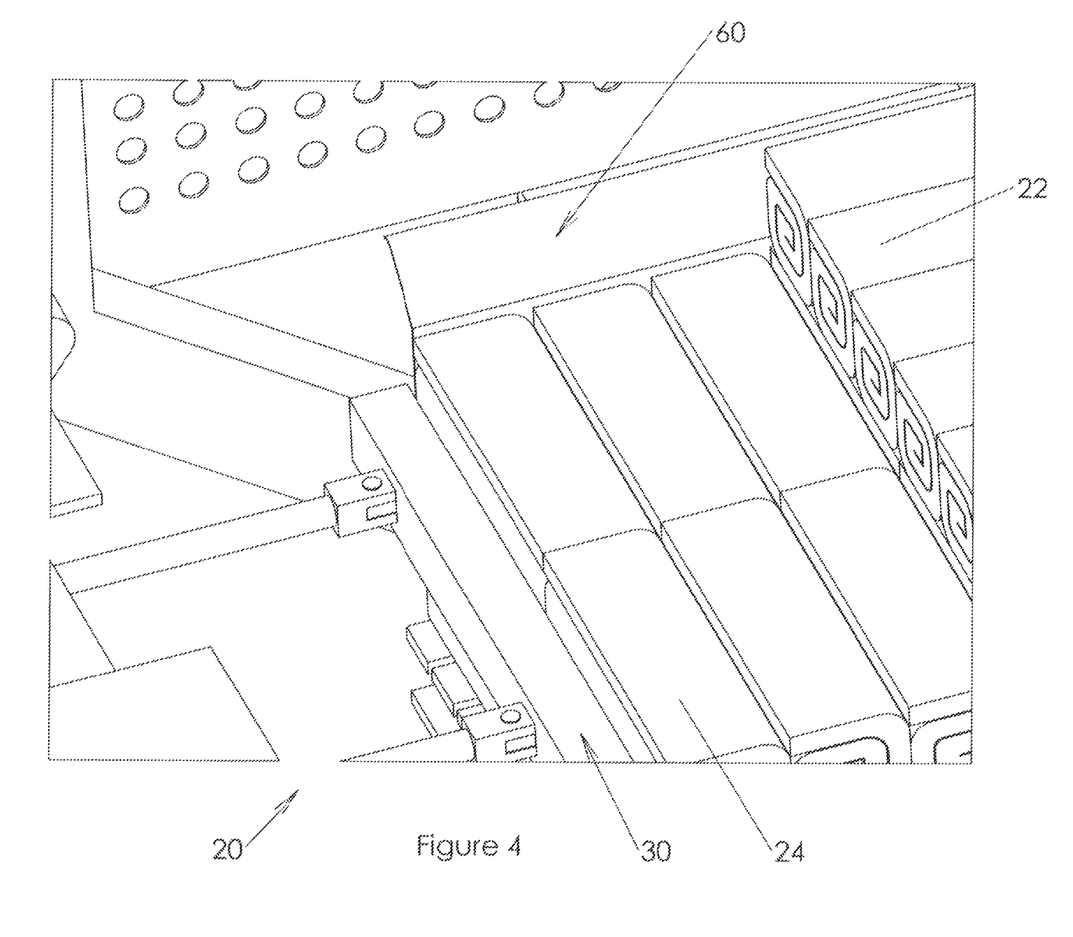
FIG. 4 is a perspective view of the pallet stacking region shown in FIG. 3 with the pick-and-place out of view.

With reference to FIG. 3, the pick head 17 of pick-and-place apparatus 16 is operative to pick arrays of sod rolls and place them in layers in the pallet stacking region 20. As shown here, a layer compactor 30, according to an exemplary embodiment, is in a retracted position while pick-and-place head 17 deposits an array of sod rolls. In FIG. 4, the pick head 17 has moved to pick another array of sod rolls while layer compactor 30 pushes against the layer of sod rolls. Similarly, side compactor 60 pushes against the sod rolls in a direction orthogonal to that of layer compactor 30.

Figure 5:
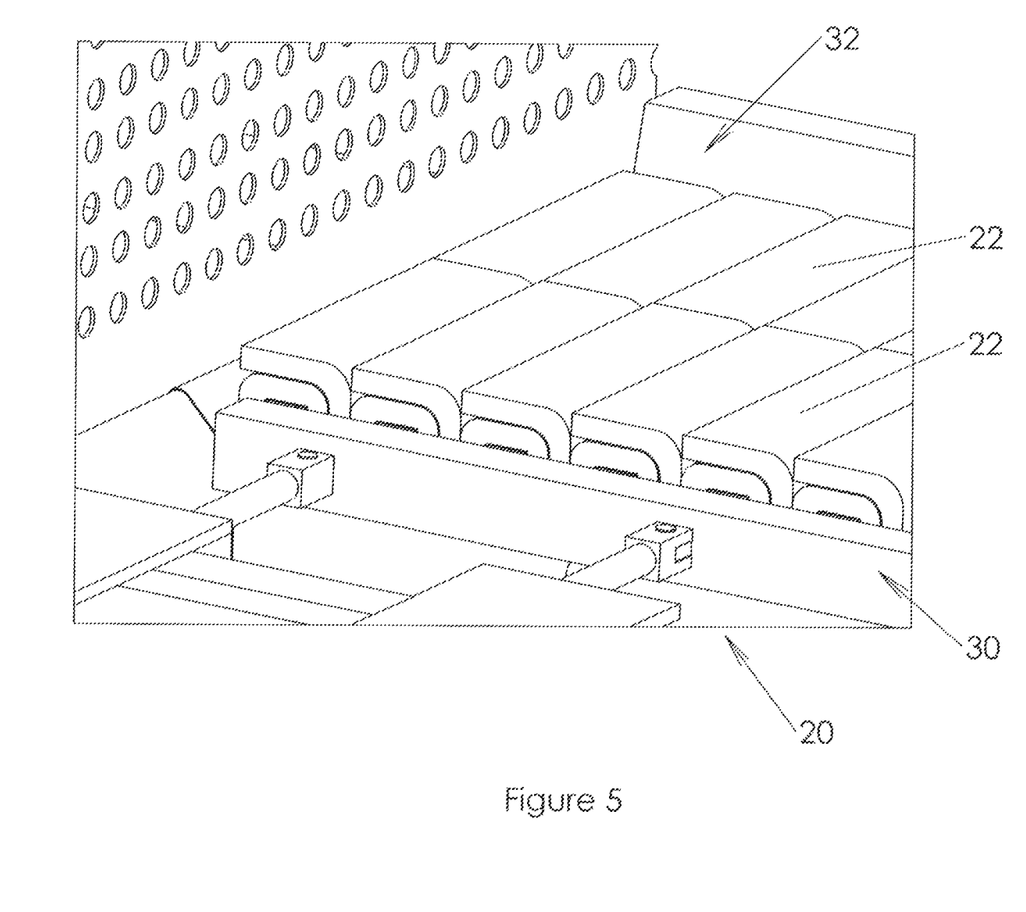
FIG. 5 is a perspective view of the pallet stacking region illustrating a layer of columns of sod rolls.
Figure 6:
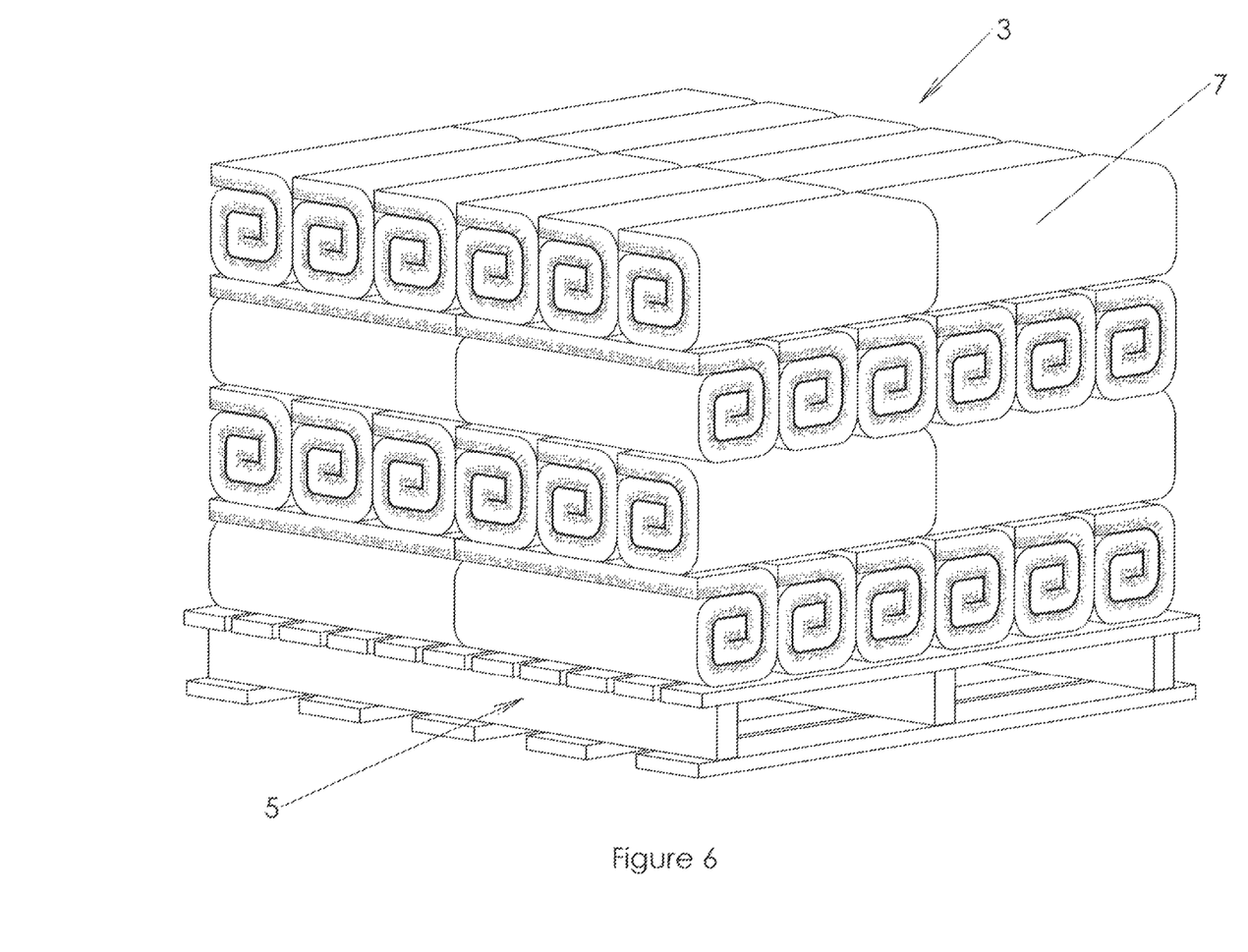
FIG. 6 is a perspective view of an exemplary stacked pallet.

It can be appreciated in FIG. 4 that the layers are formed of sod rolls placed in alternating columns 22 and rows 24. As each layer is formed, a mechanism 40 (see FIG. 9) lowers the stack such that each consecutive layer of sod rolls is placed at the same level. With further reference to FIG. 5, it can be seen that the layer compactor 30 pushes columns 22 against a backstop 32. Accordingly, as each layer is formed, the compactors (30, 60) are operative to push the columns/rows of sod rolls together such that they form a tightly packed sod stack 3, such as shown in FIG. 6. Sod stack 3 is composed of a plurality of sod rolls 7 which are formed as described above on pallet 5.

Figure 7:
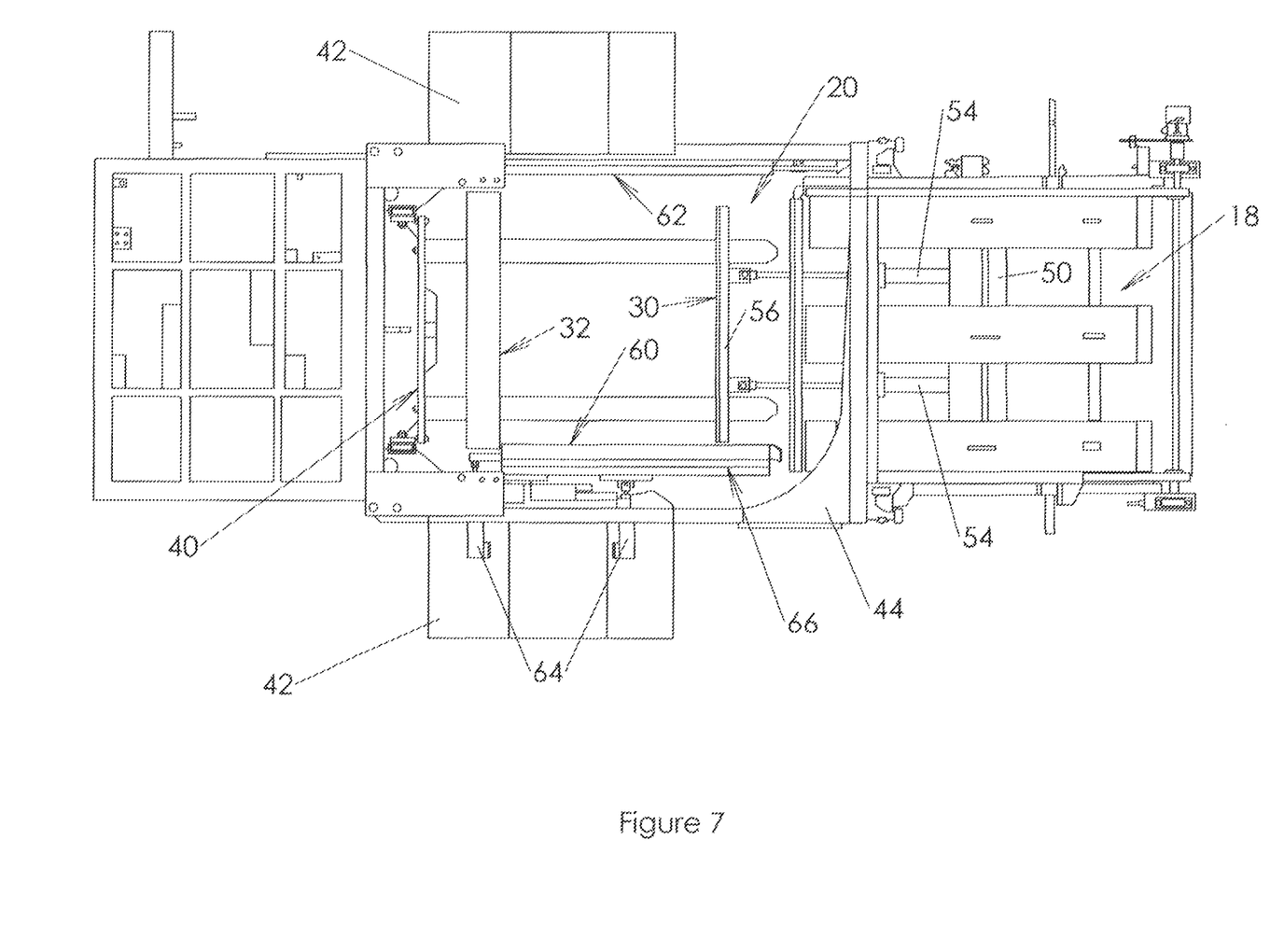
FIG. 7 is a top plan view of the pallet stacking region with associated pallet magazine and layer compactors.
Figure 8:
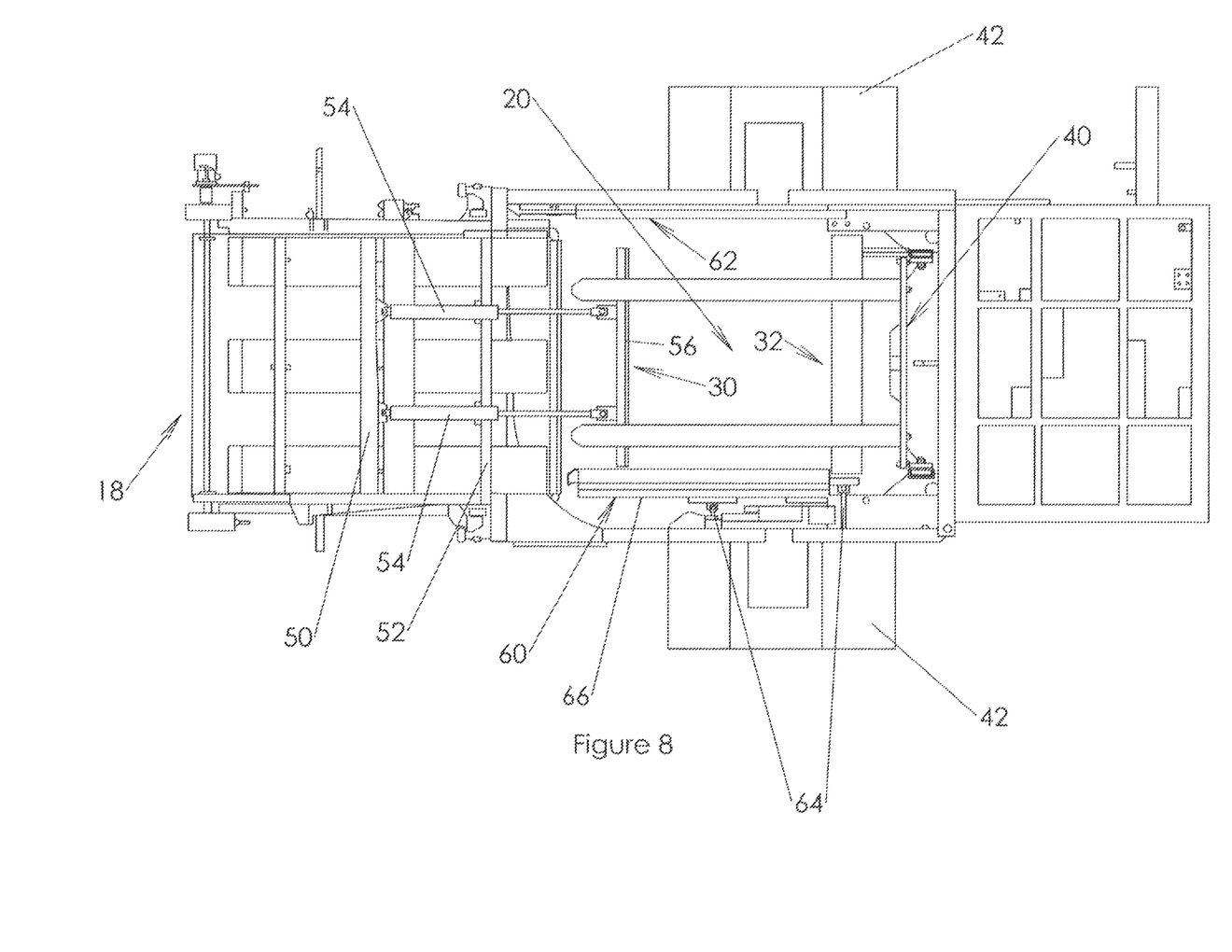
FIG. 8 is a bottom plan view of the pallet stacking region with associated pallet magazine and layer compactors.
Figure 9:
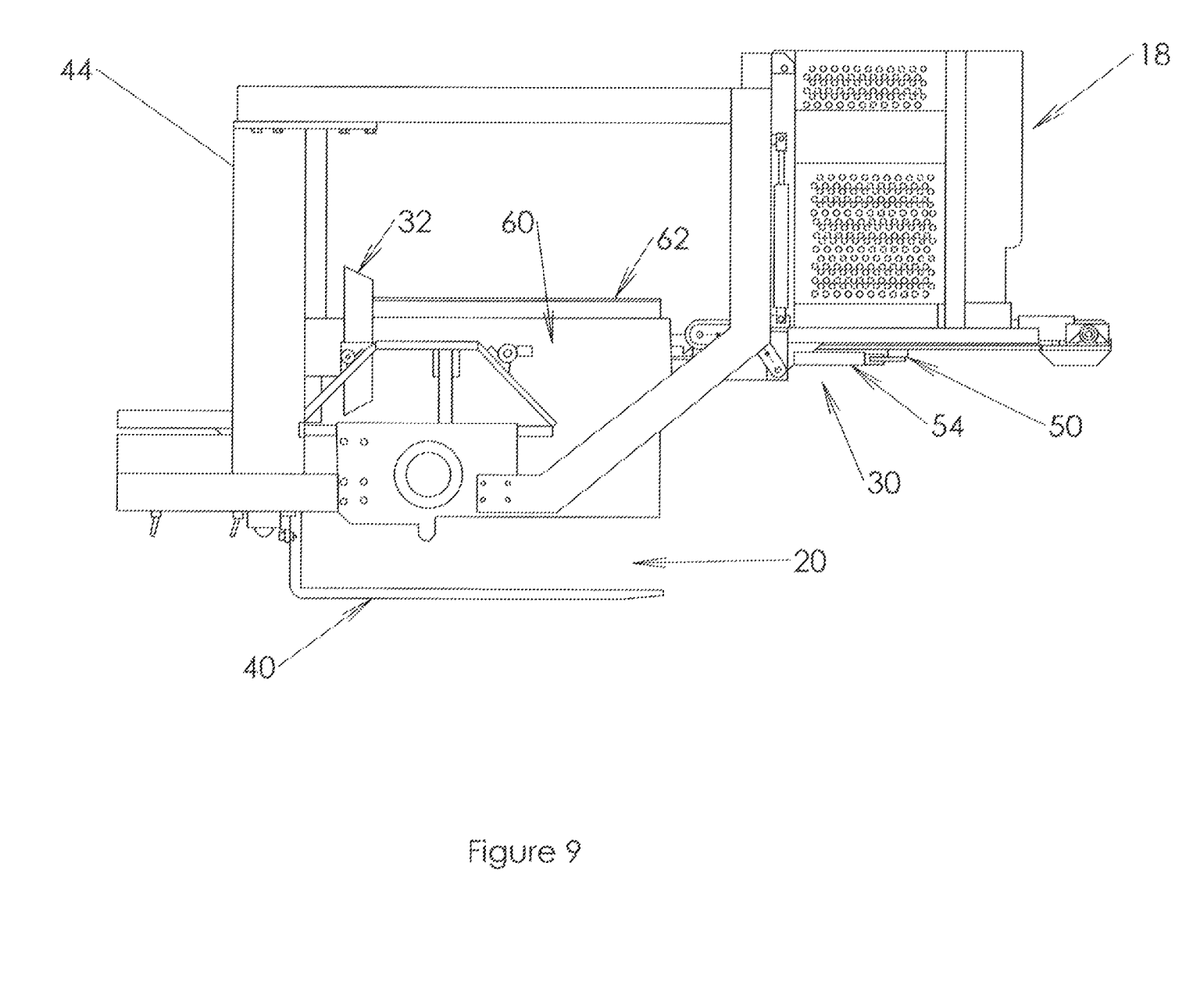
FIG. 9 is a side view in elevation of the pallet stacking region shown in FIGS. 7 and 8.

With reference to FIGS. 7-9, the layer compactor 30 is composed of a pair of cylinders 54 which are disposed beneath the pallet magazine 18. A pusher bar 56 is attached to cylinders 54 on the rod end of the cylinders. The pusher bar 56 is therefore extendible in a direction longitudinal with the frame 44 of the harvester 10. The side compactor 60 extends orthogonally with respect to the layer compactor 30. In other words, the side compactor 60 extends in a direction transverse to the frame 44.

It can be appreciated in FIG. 7, for example, that the pallet stacking region 20 is disposed between the rear wheel wells 42. Both the layer compactor 30 and the side compactor 60 push against a backstop 32 and 62, respectively. Side compactor 60 is composed of a side push bar 66 which is attached to a pair of cylinders 64. Cylinders 54 and 64 may be pneumatic or hydraulic cylinders. As perhaps best shown in FIG. 8, the layer compactor 30 is mounted beneath the pallet magazine 18 on mounting bars 50 and 52.

Accordingly, the sod roll layer compactor has been described with some degree of particularity directed to the exemplary embodiments. It should be appreciated, though, that modifications or changes may be made to the exemplary embodiments without departing from the inventive concepts contained herein.

I claim:

1. A sod harvester comprising:
   (a) a sod cutter assembly that is configured to shave slabs of sod material from a field and cut them into lengths;
   (b) a sod rolling assembly that is configured to roll the sod slabs as they are conveyed to a sod roll array forming station;
   (c) two rear wheel wells situated directly above two rear wheels;
   (d) a pallet stacking region that is disposed between the two rear wheel wells;
   (e) a pallet magazine that is situated above the pallet stacking region and configured to feed pallets into the pallet stacking region;
   (f) a pick-and-place apparatus comprising a pick head that is configured to pick up arrays of sod rolls and place them in layers in the pallet stacking region;
   (g) a layer compactor that is comprised of a pair of cylinders that are disposed beneath the pallet magazine and a pusher bar that is attached to the cylinders, the layer compactor being mounted beneath the pallet magazine on mounting bars, the pusher bar being extendible in a direction longitudinal with a frame of the harvester, and the side compactor extending orthogonally with respect to the layer compactor and in a direction transverse to the frame, the layer compactor being configured to retract when the pick head deposits the arrays of sod rolls onto the pallet stacking region and to extend when the pick head moves to pick up an array of sod rolls; and
   (h) a side compactor that is comprised of a side push bar that is attached to a pair of cylinders, the side compactor being configured to push against the sod rolls in a direction orthogonal to that of the layer compactor.

2. The sod harvester of claim 1, further comprising a lift mechanism that extends horizontally rearward from the frame between the two rear wheel wells and is configured to lower the layers of sod rolls on the pallet stacking region as each consecutive layer of sod rolls is placed onto the pallet stacking region.

* * * * *